Aug. 10, 1965
M. B. KUDSI
3,199,273
SEPARATOR FOR LIQUID AND GASEOUS FLUIDS
Filed Dec. 4, 1962
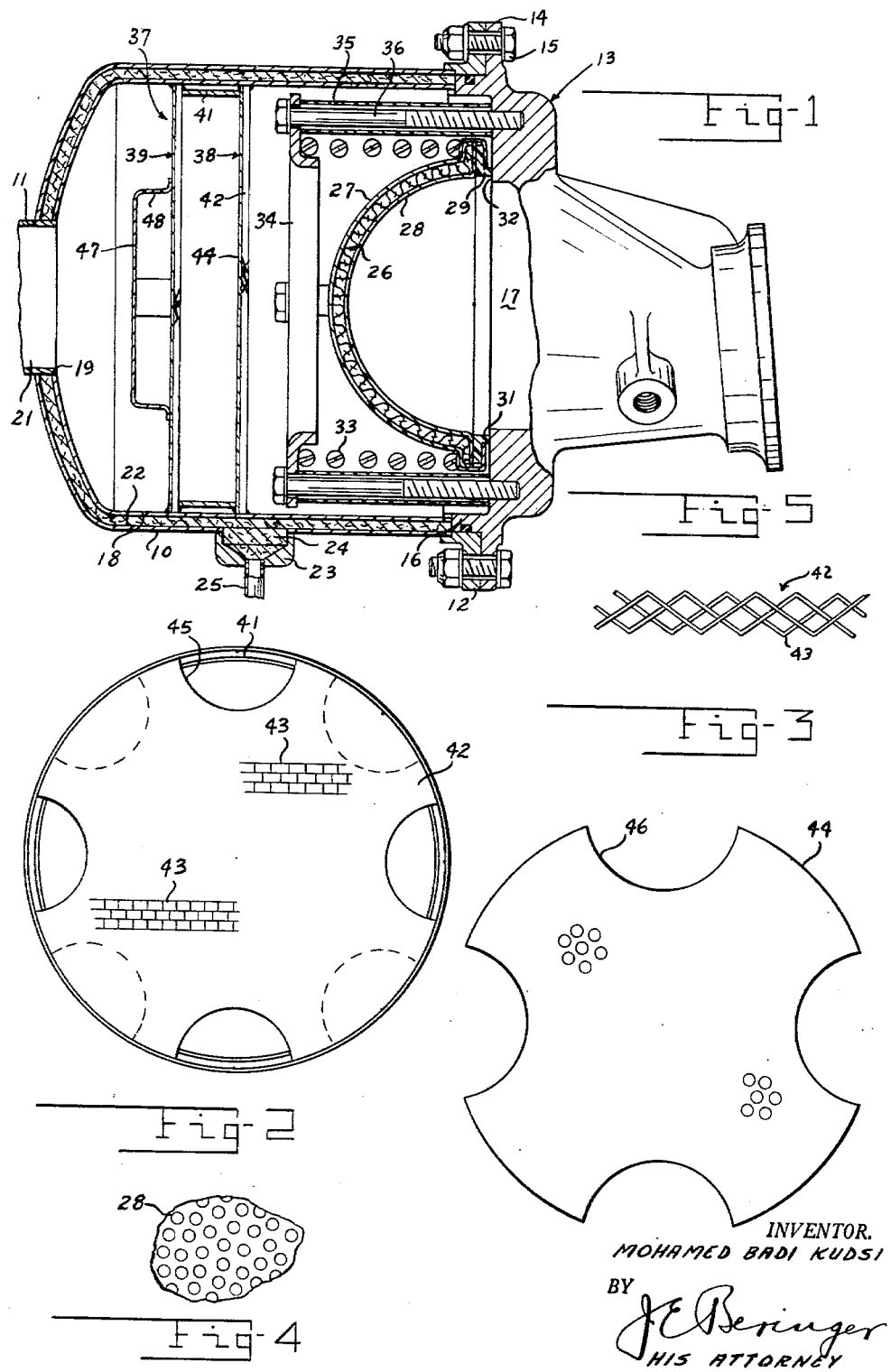
INVENTOR.
MOHAMED BADI KUDSI
BY J.E. Beringer
HIS ATTORNEY

United States Patent Office 3,199,273
Patented Aug. 10, 1965

3,199,273
SEPARATOR FOR LIQUID AND GASEOUS FLUIDS
Mohamed B. Kudsi, Dayton, Ohio, assignor to United Aircraft Products, Inc., Dayton, Ohio, a corporation of Ohio
Filed Dec. 4, 1962, Ser. No. 242,228
2 Claims. (Cl. 55—318)

This invention relates to liquid separators operable to remove a liquid, such as water, from a flowing gaseous fluid, such as air. Although not so limited, the invention has particular utility in aircraft and aerospace equipment wherein high level efficiency requirements exist and wherein there is a need for continuing effective operation irrespective of attitude, temperature conditions and other variables.

An object of the invention is to construct a separator as described of special facility in the removal and carrying off of liquid entrained in a flowing gaseous fluid.

Another object of the invention is to incorporate safeguards in the separator obviating misoperation due to icing and other clogging conditions.

A further object of the invention is to construct a separator as described for functioning in plural stages wherein coalescing means is combined with all attitude liquid entrapment and removal.

Other objects and structural details of the invention will appear from the following description when read in connection with the accompanying drawing, wherein:

FIG. 1 is a view in longitudinal section of a liquid separator in accordance with the illustrated embodiment of the invention;

FIG. 2 is a detail plan view of a collector plate assembly comprised in the separator of FIG. 1;

FIG. 3 is a detail plan view of a support element comprised in the assembly of FIG. 2;

FIG. 4 is a fragmentary view of retainer means in the separator, showing the perforate construction thereof; and FIG. 5 is a fragmentary view in end elevation of a collector plate.

Referring to the drawing, a separator in accordance with the illustrated embodiment of the invention comprises a cylindrical housing 10 open at one end and closed at the other except for a relatively reduced diameter opening 11. At the open end of the housing is attached, as by brazing, a flange 12. A head 13 in the form of a casting has a flange portion 14 mating with the flange 12 and secured thereto by bolts 15. A projecting cylindrical portion 16 of the head 13 is closely received in the flange 12. The described arrangement makes of the housing 10 and head 13 an integrated housing unit.

The head 13 is formed with a through passage 17 opening to the interior of the housing 10 through the open end thereof. Passage 17 communicates at its opposite end with a source of fluid under pressure and may be considered the separator inlet while oppositely disposed opening 11 is the separator outlet for the gaseous fluid. In a nested relation in housing 10 is a cup-like retainer 18. At its one end the retainer 18 is open like housing 10 and abuts the inwardly projecting portion 16. The opposite end of the retainer 18 is closed except for an opening 19 aligned with the housing opening 11. The pair of aligned openings 11 and 19 receive a discharge fitting 21. The housing 10 and retainer 18 are spaced apart and receive between them a layer of a wicking material 22, for example felt. The retainer 18 is made of sheet metal or the like for suitable rigidity and is perforated, as indicated in FIG. 4, so that fluids within the separator have access therethrough to the material 22. Liquids are absorbed into the wicking material and drawn by capillary attraction to a liquid outlet 23 containing a plug 24 of the same felt material 22, and providing a mounted drain 25. The material 22, in the layer form in which it is comprised between retainer 18 and housing 10, plus the plug represented by portion 24 effectively limits escape of gaseous fluids by way of outlet 23 while the pressure difference within and without the separator assists in expelling liquid through the plug 24 to the drain 25.

The gaseous fluid with its entrained liquid particles has access first to coalescing means in the form of a fabric material contained between a pair of concavo-convex retainer members 27 and 28 suitably spaced apart and held in an assembled relation by clamping means 29. The latter further embraces and holds an annular member 31 made of a plastic or similar material to act as a seal against an inwardly facing surface 32 on the head 13. The sealing means 31 thus surrounds inlet opening 17 and seats against surface 32 in a manner to constrain the incoming moisture laden fluid to be applied to the retainer members 27 and 28 and the enclosed fabric 26. The members 27 and 28 are constructed of perforate sheet metal, like retainer 18, so that the gaseous fluid may flow relatively freely therethrough.

In the process of passing through the fabric 26 the moisture content of the fluid is condensed or coalesced and assumes the form of relatively large droplets which are in the course of continuing operation blown through the fabric to the interior proper of the separator. The coalescing device as represented by the fabric 26, the retainers 27 and 28, clamp 29 and sealing member 31 is urged as a unit to a seat on surface 32 by a compression spring 33 seated on an annular plate 34 disposed transversely of the coalescing device within the housing 10. The annular plate 34 is spaced from the head 13 by a plurality of circumferentially spaced apart tubes 35 and is rigidly positioned by virtue of bolts 36 passed through the tubes 35 and anchored in the head 13. Under icing or like conditions tending to clog the fabric 26 the coalescing device accordingly may yield and permit by-passing flow of the incoming gaseous fluid into the separator housing 10.

Also transversely disposed in the separator housing, intermediate the coalescing device and outlet fitting 21 is a collector plate assembly 37 comprised of plate units 38 and 39 held in longitudinally spaced relation by a ring 41. The unit 38 comprises a flat plate 42 cut and crimped to take on the characteristics of strip fin material. Thus, a plurality of parallel slits in the material of the plate define strips 43 and these are crimped, with the peaks and valleys of one strip in offset relation to the peaks and valleys of adjacent strips. The result of such construction is that the plate 42 presents a surface to the incoming fluids which is large in area to intercept and have precipitated thereon the liquid droplets blown from fabric 26 but which presents likewise a large amount of open area through which the gaseous fluid may flow through the plate and on to the fluid outlet. Further comprised in the unit 38 is a back-up plate 44 which contacts what may be considered the underside or back side of plate 42 and serves as a stiffener therefor. As seen in FIG. 3, the back-up plate 44 is perforated for a free flow of air or gas therethrough. In the periphery of the strip material 42, and in the stiffener plate 44, are corresponding peripheral cut-outs 45 and 46, respectively, circumferentially spaced apart. The plates of the unit are superposed, with corresponding cut outs aligned with one another.

The plate unit 39 is constructed to be identical with the plate unit 38. It is, however, rotatably positioned relatively to the unit 38 to place the peripheral cut outs thereof out of alignment with the cut outs of unit 38.

Additionally, there is fastened to the underside of unit 39 or to the stiffener plate element thereof diffuser means in the form of a plate 47 of relatively reduced diameter mounted to the unit 39 by peripheral, circumferentially spaced legs 48. The spacer 41, like other parts within the housing, is perforated for fluid flow therethrough.

In the operation thereof, the separator is installed in a system directing a moisture laden fluid under pressure, for example compressed air containing water particles, to the separator by way of inlet 17. There it is constrained by the coalescing device which is seated on head 13 in a manner to close inlet 17, to flow through the fabric material 26. Continuing on beyond the coalescing device, with the moisture now in the form of relatively large droplets, the fluid encounters the collector plate assembly 37. The air is permitted to pass through the plate units 38 and 39 by virtue of its access to slitted and crimped portions of the strip fin material and continues on to the outlet fitting 21, axial flow to the fitting being inhibited by diffuser 47. The relatively large water droplets, however, impinge on the plate surfaces and run or drip to the wall of the separator where they are absorbed into the wicking material 22. The absorbed material moves by capillary action to water outlet 23 and drains therefrom by way of fitting 25.

Coalescing material 26 is, as noted, a fabric. It has characteristics of porosity and interposes an arrangement of fibers tending to intercept and form nuclei of individual particles of moisture which gather other particles about them and build into water droplets subsequently blown through and beyond the fabric to the collector plate assembly. A synthetic fabric, for example nylon or glass fiber cloth may suitably be used.

The separator thus functions to remove the liquid in stages, the first involving a coalescing of entrained moisture, and subsequent stages collecting and disposing of the separated liquid. A very high level of efficiency is achieved, as well as provision being made for continuing effective operation in all attitudes. Icing at the coalescing device is accommodated by pressure relief action thereof as described. Icing at the collector plate assembly is unable to block flow through the separator since peripheral cut outs 45–46 admit of by-pass. The angularly offset relation of these cut outs on the adjacent plate units, however, insure that all of the flowing is brought into contact with a collector plate surface.

Coalescing means 26 is referred to herein as a "fabric," but this term is not intended to describe cloth or cloth-like materials only. Any generally porous material offering fibre-like components upon which moisture may condense may be found suitable for the purpose.

What is claimed is:

1. A separator for removing liquid particles in a flowing gaseous fluid, including a housing having a fluid inlet, coalescing means disposed in said housing across said inlet for flow of the fluid therethrough, liquid particles condensing therein and being blown therefrom as liquid droplets, collector means in said housing beyond said coalescing means presenting a surface for impingement of said droplets thereon and open passages for flow of gaseous fluid therethrough, said collector means including longitudinally spaced apart baffle plates having by-pass openings therein, said plates being relatively rotatably positioned to misalign corresponding by-pass openings of adjacent plates, wick means lining said housing and absorbing liquid draining from said surface said collector means being disposed transversely of the path of fluid flow in substantially peripheral contact with said wick means, the liquid running or dripping therealong to said wick means, and a fluid outlet from said housing beyond said collector means, and a liquid outlet from said housing in advance of said collector means.

2. A separator for removing in stages moisture entrained in a flowing gaseous fluid, including a housing having oppositely disposed inlet and outlet fluid openings, said housing having intermediate said inlet and outlet openings a laterally disposed liquid outlet, the fluid with entrained moisture entering the housing through said inlet opening, a wicking material installed as a liner in said housing in covering relation to said lateral liquid outlet, a perforate retainer transversely disposed in said housing between said inlet and outlet openings and in advance of said lateral liquid outlet, positioned to constrain the incoming moisture entraining fluid to pass therethrough prior to gaining access to said wicking material, a coalescing fabric carried by said retainer, means on said retainer comprising peripheral sealing means engageable on the housing in a seated relation about said inlet opening, and means yieldingly urging said retainer to a seat on said housing.

References Cited by the Examiner

UNITED STATES PATENTS

| | | | |
|---|---|---|---|
| 512,681 | 1/94 | Clute | 55—446 |
| 942,503 | 12/09 | Jacobs | 55—317 |
| 1,544,950 | 7/25 | Smith | 55—327 |
| 1,621,026 | 3/27 | Pukerud | 55—308 |
| 1,769,778 | 7/30 | Field | 55—446 |
| 2,521,785 | 9/50 | Goodloe | 55—482 |
| 2,607,437 | 8/52 | Crawford et al. | 55—313 |
| 2,634,820 | 4/53 | Andersen et al. | 55—313 |
| 2,745,513 | 5/56 | Massey. | |
| 2,823,760 | 2/58 | Anderson | 55—237 |
| 2,835,340 | 5/58 | McGuff et al. | 55—482 |
| 2,840,183 | 6/58 | George | 55—267 |
| 2,848,060 | 8/58 | McBride et al. | |
| 2,921,646 | 1/60 | Poole | 55—327 |

FOREIGN PATENTS 1,158,809   2/58   France.

HARRY B. THORNTON, *Primary Examiner.*